US012802003B2

(12) United States Patent
Hong et al.

(10) Patent No.: US 12,802,003 B2
(45) Date of Patent: Nov. 17, 2026

(54) NATURAL LANGUAGE GENERATOR SUPPORT FOR SOFTWARE MAINTENACE

(71) Applicant: SAP SE, Walldorf (DE)

(72) Inventors: Jingun Hong, Seoul (KR); Jinah Jung, Seoul (KR); Hyo-In Jung, Gyeonggi-do (KR)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 18/652,562

(22) Filed: May 1, 2024

(65) Prior Publication Data

US 2025/0342414 A1 Nov. 6, 2025

(51) Int. Cl.
*G06Q 10/0631* (2023.01)

(52) U.S. Cl.
CPC .............................. *G06Q 10/06311* (2013.01)

(58) Field of Classification Search
None
See application file for complete search history.

(56) References Cited

U.S. PATENT DOCUMENTS 8,935,153 B2 * 1/2015 McKeeman ............ G06F 40/20 704/9
12,536,505 B2 * 1/2026 Wilson .................. G06F 3/0482
2020/0042295 A1 * 2/2020 Straub .................. G06N 3/0442
2020/0322703 A1 * 10/2020 Bures ...................... G06F 16/27
2021/0081559 A1 * 3/2021 Gratton ................. G06F 21/604
2025/0005589 A1 * 1/2025 Li .......................... G06Q 30/01
2025/0086391 A1 * 3/2025 Kempf .................... G06F 16/31
2025/0324220 A1 * 10/2025 Turpin ................. G08B 29/186
2025/0348360 A1 * 11/2025 Abadi ................... G06F 9/5027

* cited by examiner

*Primary Examiner* — Folashade Anderson
(74) *Attorney, Agent, or Firm* — Klarquist Sparkman, LLP

(57) ABSTRACT

Techniques and solutions are provided for facilitating the documentation, resolution, and review of software support incidents. In one aspect, a natural language generator is provided with information about a software support incident and creates an incident report. In another aspect, a natural language generator receives information about a software support incident and information about prior software support incidents. The natural language generator proposes solutions to resolve the software support incident. In another aspect, the natural language generator analyzes software support incidents, including resolutions, and provides a summary of software support incidents, and can provide suggested actions to reduce the occurrence of future incidents. The present disclosure also provides techniques for extracting and standardizing incident data, which can improve the quality of results generated by the natural language generator.

20 Claims, 21 Drawing Sheets

300

Title: Unable to Submit Order on Checkout Page 302
Priority: High 304
Reporter: Jinah 306 308
Component: Transaction Handling
Date Reported: 06:23:2024:10:49 310
Incident Start Time: 06:22:2024:01:23 312
Incident End Time: 06:23:2024:06:45 314

---

Description: When attempting to submit an order on the checkout page, users encounter an error preventing them from completing the transaction. The issue appears to be widespread and is affecting both desktop and mobile users. 320

Steps to Reproduce: 322
1. Navigate to the online store.
2. Add items to the cart.
3. Proceed to the checkout page.
4. Fill in the required information (shipping address, payment method, etc.).
5. Click on the "Submit Order" button.

324

326 Expected Behavior: The order should be submitted successfully, and users should be directed to a confirmation page.
Actual Behavior: After clicking on the "Submit Order" button, users encounter an error message stating "Internal Server Error - 500." The order is not processed, and users are unable to complete the transaction.
330 Impact: This issue is impacting all users attempting to make purchases on the website. As a result, it is significantly affecting our e-commerce revenue and causing frustration among our customers.

Environment: 334
- Operating System: Windows 10, MacOS, Android, iOS
- Browser: Chrome, Firefox, Safari
- Device: Desktop, Mobile

Attachments: 336
- Screenshots of the error message
- Error logs (if available)

340

Additional Information:
- This issue started occurring yesterday after a recent deployment to the production environment.
- No recent changes have been made to the checkout process or underlying codebase.
- We have attempted to replicate the issue in our testing environment but have been unsuccessful.

Resolution Steps Taken: 344
1 .Rolled back the recent deployment to isolate any changes that may have caused the issue.
2. Reviewed server logs for any errors or anomalies.
3. Engaged with the development team to investigate the root cause of the problem.
4. Implemented temporary workaround to allow users to complete orders manually.

Next Steps: 346
1. Conduct a thorough investigation to identify the root cause of the issue.
2 .Develop and implement a permanent solution to prevent recurrence.
3. Perform regression testing to ensure that the fix does not introduce any new issues.
4. Communicate updates and resolution timeline to stakeholders and customers.

348
Related Issues:
- [Link to related Jira issues, if applicable]

354 Comments:
- [Any additional comments or observations]

FIG. 3

400

Subject: Critical Error Alert: Internal Server Error - 500 on Checkout Page

Description: Our monitoring service has detected a significant increase in Internal Server Errors (HTTP 500) originating from the checkout page of our e-commerce platform. This issue is affecting both desktop and mobile users and is impacting the ability to submit orders. Immediate investigation and action are recommended to address the root cause and restore service functionality.

Timestamp: 06:23:2024:06:32

Severity: Critical

Affected Component: Checkout Process

Impact: High - Users are unable to complete transactions, leading to potential revenue loss and negative customer experience.

Action Required:

1. Investigate the root cause of the Internal Server Errors.
2. Implement temporary workaround if possible to mitigate impact on users.
3. Communicate with stakeholders and keep them updated on the progress.

450

Description: Hey there, I just tried to place an order on your website, but I keep getting an error when I try to submit my order. It says something like "Internal Server Error - 500." I've tried a few times, but it's not working. Can you please look into this? I really need to complete my purchase.

Timestamp: 06:23:2024:06:32

Additional Information:

- Browser: Chrome
- Operating System: Windows 10
- Device: Desktop

FIG. 4

[Slack Conversation - Incident: Unable to Submit Order on Checkout Page]
[Channel: #support-engineers]
[Participants: John (Support Engineer), Sarah (Support Engineer), David (Development Lead), Emily (Product Manager)]

500

John [9:00 AM]: Hey team, I've noticed an increase in reports from users unable to submit orders on the checkout page. Seeing an "Internal Server Error - 500" message. Anyone else experiencing this?

Sarah [9:05 AM]: Yeah, I've been getting similar reports from users as well. Seems like it's affecting both desktop and mobile platforms.

David [9:10 AM]: Thanks for bringing this up, John and Sarah. I'll dive into the logs and see if there's any indication of what might be causing the issue.

Emily [9:15 AM]: I'm jumping in here as well. We need to prioritize getting this fixed ASAP. Can someone start investigating the root cause?
John [9:20 AM]: David, any updates from the logs?

David [9:25 AM]: Just finished reviewing the logs. Looks like there's a spike in 500 errors starting around 8:30 AM originating from the checkout process after yesterday's deployment. I'll continue digging to pinpoint the exact cause.

Sarah [9:30 AM]: Should we roll back the recent deployment for now to mitigate the impact on users?

David [9:35 AM]: Agreed, Sarah. Let's roll it back as a temporary measure while we investigate further.

Emily [9:40 AM]: Let's also notify the stakeholders about the issue and our plan of action. We need to manage customer expectations.

John [9:45 AM]: I'll draft a customer-facing message to inform them about the temporary workaround and our efforts to resolve the issue.

Sarah [9:50 AM]: I'll start working on reproducing the issue in our testing environment to assist with the investigation.

David [9:55 AM]: Thanks, everyone, for jumping on this. Let's keep communication open and collaborate to get this resolved quickly.

Emily [10:00 AM]: Agreed. We'll provide regular updates as we progress. Let's aim to have a resolution plan by the end of the day.

David [1:00 PM]: Update: Found the root cause of the issue. It was due to a recent configuration change in the payment gateway settings. Working on reverting the change now.

Sarah [2:00 PM]: Successfully reproduced the issue in the testing environment. David's findings align with our observations. Looking good so far.

John [3:00 PM]: Customer-facing message drafted and sent out. Users are informed about the workaround and our progress.

Emily [4:00 PM]: Great job, team. Let's finalize the resolution plan and schedule the deployment for tomorrow morning.

David [5:00 PM]: Reverted the configuration change in the payment gateway settings. Verified that the issue is resolved in the testing environment.

Sarah [6:00 PM]: Regression tests completed. No new issues identified. Ready to proceed with the deployment tomorrow.

Emily [7:00 PM]: Excellent work, everyone. Let's reconvene tomorrow after the deployment to ensure everything is running smoothly.

Emily [Next Day - 9:00 AM]: Post-deployment check completed. No reports of errors from users overnight. I think we can consider this incident resolved.

David [9:05 AM]: Agreed, Emily. Everything looks stable from our end as well.

John [9:10 AM]: Customers are also confirming that they can now submit orders without encountering any errors. Looks like we're in the clear.

Sarah [9:15 AM]: Fantastic news! I'll update the incident report in Jira to reflect the resolution and close it out.

Emily [9:20 AM]: Thanks, Sarah. And thank you, everyone, for your hard work on resolving this issue swiftly.

FIG. 5

600

Incident Investigation Report
Issue: Unable to Submit Order on Checkout Page
610
Date Reported: June 23, 2024
Reporter: Mitigation Assistant
Summary: We are currently investigating an issue reported by users regarding the inability to submit orders on the checkout page, resulting in an "Internal Server Error - 500." Despite ongoing investigation, the root cause has not yet been identified. To expedite the resolution process, I have reviewed historical incident reports related to similar issues and compiled the following suggestions:
620
1. Database Performance: In past incidents, database latency has been a contributing factor to similar errors during peak traffic periods. We should analyze recent database performance metrics to identify any anomalies or issues. [Link to Incident Report: Database Latency Issue - Incident ID: XXXX]
2. Checkout Process Changes: Review recent changes or updates made to the checkout process or underlying codebase. Even minor alterations could potentially lead to unintended consequences and errors. [Link to Incident Report: Checkout Process Update - Incident ID: XXXX]
3. Payment Gateway Interaction: Investigate the interaction between our website and the payment gateway. Previous incidents have highlighted connectivity issues or misconfigured settings as potential causes of checkout errors. [Link to Incident Report: Payment Gateway Connectivity Issue - Incident ID: XXXX]
4. Infrastructure Assessment: Involve the infrastructure team to assess server capacity and network connectivity. Issues related to server resources or network performance could impact the checkout process. [Link to Incident Report: Server Capacity Issues - Incident ID: XXXX]

630
Action Plan:
1. Database Analysis: Request database performance metrics from the operations team and conduct a thorough analysis to identify any performance bottlenecks or irregularities.
2. Codebase Review: Review recent deployments and changes to the checkout process codebase to pinpoint any potential causes of the error.
3. Payment Gateway Examination: Collaborate with the payments team to review logs and configurations related to interactions with the payment gateway.
4. Infrastructure Review: Engage with the infrastructure team to review server logs and network performance metrics to ensure optimal system operation.

Next Steps:
1. Implement suggested actions to identify and resolve the root cause of the issue.
2. Communicate progress updates to stakeholders and customers.
3. Continuously monitor system performance to prevent recurrence of similar incidents.

Conclusion: By leveraging insights from past incidents and implementing the suggested actions, we aim to expedite the resolution of the current issue and minimize impact on users and business operations.

FIG. 6

700

Table Name:
T_JIRA_BUG_TREND

Schema:
HANA_REPORTING_DATA#JIRA

| Name | SQL Data Type | Default |
|---|---|---|
| ISSUEID | DECIMAL(18,0) | NULL |
| ISSUEKEY | NVARCHAR(255) | NULL |
| PROJECT | NVARCHAR(255) | NULL |
| PROJECTKEY | NVARCHAR(255) | NULL |
| SUMMARY | NVARCHAR(1000) | NULL |
| DESCRIPTION | NVARCHAR(2000) | NULL |
| ISSUESTATUS | NVARCHAR(255) | NULL |
| ISSUETYPE | NVARCHAR(255) | NULL |
| DATECREATED | TIMESTAMP | NULL |
| ASSIGNEE | NVARCHAR(255) | NULL |
| REPORTER | NVARCHAR(255) | NULL |
| RESOLUTIONDATE | TIMESTAMP | NULL |
| ASSIGNEE_DISPLAY_NAME | NVARCHAR(100) | NULL |
| UPDATED | TIMESTAMP | NULL |
| TIMEORIGINALESTIMATE | DECIMAL(18,0) | NULL |
| TIMEESTIMATE | DECIMAL(18,0) | NULL |
| TIMESPENT | DECIMAL(18,0) | NULL |
| VOTES | DECIMAL(18,0) | NULL |
| RESOLUTION | NVARCHAR(100) | NULL |
| SNAPSHOT_DATE | DATE | NULL |
| REPORTER_DISPLAY_NAME | NVARCHAR(100) | NULL |
| SNAPSHOT_TS_UTC TIMESTAMP | TIMESTAMP | CURRENT_TIME |

FIG. 7

800

Table Name:
T_JIRA_BUG_INCIDENT

Schema:
HANA_REPORTING_DATA#JIRA

| Name | SQL Data Type | Default |
|---|---|---|
| ISSUEKEY | NVARCHAR(255) | NULL |
| COMPONENT | NVARCHAR(32) | NULL |
| START_TIMESTAMP | TIMESTAMP | NULL |
| END_TIMESTAMP | TIMESTAMP | NULL |
| DURATION_MINUTES | INTEGER | NULL |
| SNAPSHOT_TS_UTC TIMESTAMP | TIMESTAMP | CURRENT_TIME |

FIG. 8

900

Year 2023 Quarter time_tange_from 2023-01-01 time_tange_to 2024-01-01

910

| Issue_Key | Incident Start Time | Incident End Time | Duration |
|---|---|---|---|
| HDBINFRAIRT-989 | 2023-04-21 01:30:00 | 2023-04-19 16:00:00 | -1.54 day (914) |
| HDBINFRAIRT-1187 | 2023-09-20 07:30:00 | 2023-09-20 07:35:00 | 5 min |
| HDBINFRAIRT-913 | 2023-03-02 02:47:00 | 2023-03-02 02:55:00 | 8 min |
| HDBINFRAIRT-1128 | 2023-07-27 22:20:00 | 2023-07-27 23:09:00 | 49 min |
| HDBINFRAIRT-977 | 2023-04-12 07:14:00 | 2023-04-12 08:14:00 | 1 hour |
| HDBINFRAIRT-1078 | 2023-06-12 08:52:00 | 2023-06-12 10:18:00 | 1.43 hour |

Service Level Outage Budget for Time Period: 5 hours (920) Outage To Date: 3.5 hours (922) Remaining Budget: 1.5 hours (924)

950

Query:

```
SELECT DISTINCT ISSUE_KEY, START_TIMESTAMP as “incident start time”, END-TIMESTAMP as “incident end time”,
DURATION_MINUTES as DURATION
FROM HANA_REPORTING_BUG_INCIDENT
WHERE START_TIMESTAMP BETWEEN ${time_range_from} AND ${time_range_to}
AND DURATION_MINUTES is not Null
ORDER BY DURATION_MINUTES ASC
```

FIG. 9

1010

```
MAP_PROMPT = """Find an issue key, component name, and every
   Incident Start Time and Incident End Time,
      if they exist in the data, which is a sliced part of a JSON,
         delimited by triple backticks. If not, give me an empty output.
"""
```

1015

```
MAP_HINT_PROMPT = """Hint: The issue key starts with the prefix 'HDBINFRAIRT-'
   and it is the value of key named "key",
the component name is one of ("doit", "Teststrategy", "DWC on doit",
   "Gerrit", "Grafana", "HappyMake", "HappyTest", "inframon", "InfraService",
      "Jenkins", "Server Management", "SRE"), near the key 'components'.
Incident Start Time and Incident End Time might be explicitly
   recorded in the text and if the incident start time or incident end time
      contains information to second time scale,
         then the time is not incident start time nor incident end time
            so it should be skipped.
"""
```

1020

```
REDUCE_PROMPT = """Extract issue key, component name, and
   unique Incident Start Time & Incident End Time formatted as utctimestamp,
      from the data delimited by triple backticks
         and calculate each incident's duration in minutes.
   If the data contains multiple components or multiple incident occurence,
      delimit the output by ';' and produce another
         INSERT query statement for each component / incident occurence.
Only give me the INSERT statement outputs.
"""
```

1025

```
REDUCE_HINT_PROMPT = """Hint: The issue key is unique in the data
   so if multiple issue keys exist in the data,
   the first appearing issue key is the genuine issue key
      and this should be applied in all of the output.
   incident start times and incident end times have to be paired, but if
   multiple incident end times exist in the data which is unpaired, couple
   the later incident end time to the corresponding incident start time.
"""
```

1030

```
REDUCE_OUTPUT_FORMAT_PROMPT = """Output format should be:
   INSERT INTO HANA_REPORTING_DATA#JIRA.T_JIRA_BUG_INCIDENT VALUES
   ('$issue_key','$component','$incident_start_time','$incident_end_time',
      $incident_duartion_minutes, CURRENT_UTCTIMESTAMP);
Output example:
   INSERT INTO HANA_REPORTING_DATA#JIRA.T_JIRA_BUG_INCIDENT VALUES
   ('HDBINFRASRE-90','inframon','2023-07-20 11:11','2023-07-20 12:11', 60,
CURRENT_UTCTIMESTAMP);
"""

def get_map_prompt() -> str:
   return MAP_PROMPT + MAP_HINT_PROMPT

def get_reduce_prompt() -> str:
   return REDUCE_PROMPT + REDUCE_HINT_PROMPT +
REDUCE_OUTPUT_FORMAT_PROMPT
```

FIG. 10

1100

```
import openai.error
from llm_commons.btp_llm.openai import BTPChatCompletion


def get_completion(
    prompt: str, model: str = "gpt-4-32k", temperature: int = 0
) -> str:  # noqa: E501
    """Get completion from given prompt, model and temperature."""
    messages = [{"role": "user", "content": prompt}]
    try:
        response = BTPChatCompletion.create(
            deployment_id=model, messages=messages, temperature=temperature
        )
    except openai.error.APIError:
        raise openai.error.APIError from None
    return response.choices[0].message["content"]
```

FIG. 11

1200

1210

```
import logging
from time import sleep

from hdbcli.dbapi import Cursor, IntegrityError, ProgrammingError

logger = logging.getLogger(__name__)


def get_query_issue_keys_resolved_within_days(days: int) -> str:
    """Return a query fetching issue keys resolved within given days."""
    return f"""SELECT DISTINCT ISSUEKEY
        FROM "HANA_REPORTING_DATA#JIRA"."T_JIRA_BUG_TREND"
        WHERE
            ISSUETYPE = 'Bug' AND
            PROJECTKEY = 'HDBINFRAIRT' AND
            RESOLUTIONDATE >= ADD_DAYS(CURRENT_DATE, -{days}) AND
            ISSUESTATUS IN ('Completed') AND
            ISSUEPRIORITY = 'Very High' AND
            ISSUEKEY IN
            (SELECT ISSUEKEY
            FROM
                (SELECT ISSUEKEY,
                LAST_VALUE(RESOLUTION ORDER BY SNAPSHOT_TS_UTC)
LAST_RESOLUTION
                FROM "HANA_REPORTING_DATA#JIRA"."T_JIRA_BUG_TREND"
                WHERE ISSUETYPE = 'Bug' AND PROJECTKEY = 'HDBINFRAIRT'
                GROUP BY ISSUEKEY
                )
            WHERE LAST_RESOLUTION IS NOT NULL
            )
        UNION
        SELECT DISTINCT ISSUEKEY
        FROM HANA_REPORTING_DATA#JIRA.T_JIRA_BUG_LABEL T1
        JOIN (
            SELECT DISTINCT ISSUEKEY, ISSUEID
            FROM(
            SELECT ISSUEID, ISSUEKEY, LAST_VALUE(RESOLUTION ORDER BY
SNAPSHOT_TS_UTC) LAST_RESOLUTION
                FROM HANA_REPORTING_DATA#JIRA.T_JIRA_BUG_TREND
                WHERE ISSUETYPE = 'Bug' AND
                PROJECTKEY = 'HDBINFRAIRT' AND
                ISSUEPRIORITY != 'Very High' AND
                RESOLUTIONDATE >= ADD_DAYS(CURRENT_DATE, -{days}) AND
                ISSUESTATUS IN ('Completed')
                GROUP BY ISSUEID, ISSUEKEY
            )
            WHERE LAST_RESOLUTION IS NOT NULL
        ) T2 ON T1.ISSUE_ID = T2.ISSUEID
        WHERE LABEL = 'outage'
        ORDER BY 1
        ;"""
```

FIG. 12A

1200

1230

1250

```
def fetch_resolved_issue_keys_within_days(
    cursor: Cursor, days: int
) -> list[str]:  # noqa: E501
    """Fetch issue keys solved before given days from datasphere, return as a list."""  # noqa: E501
    query_issue_keys_resolved = get_query_issue_keys_resolved_within_days(days)
    logger.info("Query: %s", query_issue_keys_resolved)

    cursor.execute(query_issue_keys_resolved)  # type: ignore
    result = cursor.fetchall()
    issue_key_list = [raw_result[0] for raw_result in result]  # type: ignore
    logger.info("Target issue keys: %s", issue_key_list)
    return issue_key_list


def insert_incident_info(
    queries_insert_incident_info: str, cursor: Cursor
) -> None:  # noqa: E501
    """Insert incident informations to datasphere."""
    for query_insert_incident_info in queries_insert_incident_info.split(";")[
        :-1
    ]:  # slicing [:-1] due to split method.
        if not query_insert_incident_info.startswith("INSERT"):
            query_insert_incident_info = query_insert_incident_info[
                query_insert_incident_info.find("INSERT INTO") :
            ]
        logger.info("Query: %s", query_insert_incident_info)
        try:
            cursor.execute(query_insert_incident_info)  # type: ignore
        except IntegrityError:
            logger.error(
                "Unique constraint violated; query: %s", query_insert_incident_info
            )
            continue
        except ProgrammingError:
            logger.error("Wrong SQL format")
            raise ProgrammingError from None
        sleep(2)
        logger.info("Execution done")
```

FIG. 12B

1300

```
import logging
from time import sleep

import click
import openai.error
from hdbcli import dbapi
from hdbcli.dbapi import Cursor, IntegrityError, ProgrammingError
from requests.auth import HTTPBasicAuth

from incident_time_jira.anonymizer import get_anonymized_jira_issue_json
from incident_time_jira.datasphere import (
    fetch_resolved_issue_keys_within_days,
    insert_incident_info,
)
from incident_time_jira.llm import get_completion
from incident_time_jira.logger import enable_logging
from incident_time_jira.prompt import get_map_prompt, get_reduce_prompt
from incident_time_jira.utils import (
    divide_string_into_token_limit,
    filter_code_block_in_jira_issue,
)

logger = logging.getLogger(__name__)
```

1308

```
def collect_resolved_incident_info(
    issue_key: str,
    auth: HTTPBasicAuth,
    anonymizer_anonymize_api_url: str,
    cursor: Cursor,
) -> None:
    """Fetch json for given issue_key and store it via cursor."""
    anonymized_jira_issue_json = get_anonymized_jira_issue_json(
        issue_key, auth, anonymizer_anonymize_api_url
    )

    # filter code block in comments to reduce payment
    filtered_jira_issue_json = filter_code_block_in_jira_issue(
        anonymized_jira_issue_json
    )

    divided_anonymized_jira_issue_json = divide_string_into_token_limit(
        filtered_jira_issue_json, "gpt-4", 30000
    )
```

FIG. 13A

1300

1340

```
map_result = "```"
for divided_info in divided_anonymized_jira_issue_json:
   prompt = get_map_prompt() + divided_info
   try:
      map_result += get_completion(prompt)
   except openai.error.APIError:
      raise openai.error.APIError from None
   map_result += "\n"
   sleep(2)
map_result += "```"
logger.info("JSON MAPPED RESULT: %s", map_result)

reduce_result = ""
prompt = get_reduce_prompt() + map_result
try:
   reduce_result += get_completion(prompt)
except openai.error.APIError:
   raise openai.error.APIError from None
logger.info("REDUCED MAPPED RESULT: %s", reduce_result)
insert_incident_info(reduce_result, cursor)
```

FIG. 13B

1300

1360

```
def divide_string_into_token_limit(
    string: str, encoding_name: str, token_limit: int
) -> list[str]:
    """divide string to comply token limit of a llm model"""
    num_slices = ceil(num_tokens_from_string(string, encoding_name) / token_limit)
    logger.info(
        "len(string): %d, token_limit: %d, num_slices: %d",
        len(string),
        token_limit,
        num_slices,
    )
    return [
        f"```{string[index : index + len(string) // num_slices]}```"
        for index in range(0, len(string), len(string) // num_slices)
    ]
```

1370

```
def num_tokens_from_string(string: str, encoding_name: str) -> int:
    """Returns the number of tokens in a text string."""
    encoding = tiktoken.encoding_for_model(encoding_name)
    return len(encoding.encode(string))
```

FIG. 13C

NATURAL LANGUAGE GENERATOR SUPPORT FOR SOFTWARE MAINTENACE

FIELD

The present disclosure generally relates to software maintenance. Particular embodiments relate to using a natural language generator to support software maintenance, such as using a natural language generator for tasks such as gathering data regarding software incidents, generating incident reports, or resolving a software incident.

BACKGROUND

Software programs can be exceedingly complex. In particular, enterprise level software applications can provide a wide range of functionality, and can process huge amounts of data, including in different formats. Software is typically tested to varying degrees prior to making software available for productive use. Further testing can be performed as part of software updates or software maintenance.

Despite this testing, software bugs or unexpected software behavior can still occur once software is "released." In some cases, software bugs may not be apparent until particular data is processed by the software, until multiple features are used together in a particular way, or until a particular set of operational conditions occurs.

It is desirable to identify software bugs or performance issues as quickly as possible, as well as to start and complete a process to resolve such bugs or issues. This is particularly important for software that supports the day-to-day activities of business enterprises, among others, as downtime can cause serious issues. Often, a software company is responsible for addressing software issues that might occur during customer use, and there may be contractual obligations regarding how quickly issues are to be identified and resolved.

Typically, software support engineers are responsible for becoming aware of an incident and indicating incident resolution, which can include creating an incident record and obtaining and analyzing information relating to the issue. This analysis can include reviewing data provided regarding the issue (such as error messages or logs, or performance information) and information provided, such as by a user/client, regarding the issue or comments made by other support personnel who may be involved in resolving the incident. The software support engineer determines how to address the issue, implements the resolution, and then closes the incident record. Various reports may be generated to document a software company's performance in identifying and resolving issues in a timely manner.

Despite best efforts, humans may neglect to perform certain tasks, or perform tasks in a particular way, which can interfere with task completion, as well as evaluating task completion. Generating incident reports can be time consuming and subject to errors. In addition, resolving incidents can depend on a particular software support engineer, their knowledge and experience, and their ability to recall and apply that knowledge and experience in resolving an incident. If the software support engineer lacks the appropriate knowledge or experience, or fails to apply it, it may take longer to resolve an incident, and then the incident may not be resolved as well as it might otherwise be. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for facilitating the documentation, resolution, and review of software support incidents. In one aspect, a natural language generator is provided with information about a software support incident and creates an incident report. In another aspect, a natural language generator receives information about a software support incident and information about prior software support incidents. The natural language generator proposes solutions to resolve the software support incident. In another aspect, the natural language generator analyzes software support incidents, including resolutions, and provides a summary of software support incidents, and can provide suggested actions to reduce the occurrence of future incidents. The present disclosure also provides techniques for extracting and standardizing incident data, which can improve the quality of results generated by the natural language generator.

In one aspect, the present disclosure provides a process of using a natural language generator to generate an incident report for a software support incident. A request to generate an incident report for a software support incident is received. Information describing the software support incident is received. At least a portion of the information describing the software support incident is submitted to a natural language generator in a prompt that includes instructions defining a report format or with a report template or report example. A response is received from the natural language generator. The response includes entries for one or more fields defined in the report template. By executing computer-executable instructions, entries are inserted into a report for the software support incident. The report is saved in a work management tool.

In another aspect, the present disclosure provides a process of generating a software support incident mitigation request using a natural language generator. A software support incident mitigation request is received. The software support incident mitigation request includes an incident identifier and incident information for a software support incident. The incident information is encoded to provide semantic embeddings for the incident information. Stored semantic embeddings of historical information for historical software incidents are searched. One more historical software incidents similar to the semantic embeddings for the incident information are identified. The semantic embeddings of the one or more historical software incidents are submitted to a natural language generator with an instruction to identify actions to resolve the software support incident based on the one or more historical software incidents. A response to the software support incident mitigation request is sent. The response includes one or more actions identified by the natural language generator.

In a further aspect, the present disclosure provides a process of extracting start and end times for one or more software support incidents using a natural language generator. Software support information describing one or more software support incidents or efforts to resolve the one or more software support incidents are received. At least a portion of the software support information are submitted to a natural language generator with an instruction to extract a start time and one or more end times for the one or more software support incidents from the software support information. A response from the natural language generator is received. The response includes extracted start and end times for one or more software support incidents.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 is an example incident report, where disclosed techniques can extract and process information from such a report, or assist in generating such a report.

FIG. 4 illustrates example alerts that can be provided for software incidents.

FIG. 5 illustrates an example conversation between software support engineers in responding to an incident.

FIG. 6 illustrates an example mitigation suggestion that can be generated using disclosed techniques.

FIG. 7 is an example database schema that can be used to store incident details.

FIG. 8 is an example database schema that can be used to track incident start and end times.

FIG. 9 is an example user interface providing incident duration information, and also providing an example query that can be executed to retrieve incident information.

FIG. 10 provides example code for a process of having a natural language generator extract incident start and end times from incident information.

FIG. 11 provides example code for submitting prompts, such as prompts shown in FIG. 10, to a natural language generator.

FIG. 12A provides example code for extracting incident information from a database.

FIG. 12B provides example code for executing a query of FIG. 12A, as well as for inserting incident information provided by a natural language generator into a database.

FIG. 13A provides example code for retrieving incident information to be submitted to a natural language generator and for preprocessing such information.

FIG. 13B provides example code for submitting data retrieved and processed using the code of FIG. 13A to a natural language generator.

FIG. 13C provides example code for dividing text to be submitted to a natural language generator into slices, where slices are submitted to the natural language generator in discrete prompts.

DETAILED DESCRIPTION

Example 1)—Overview

Figure 1:
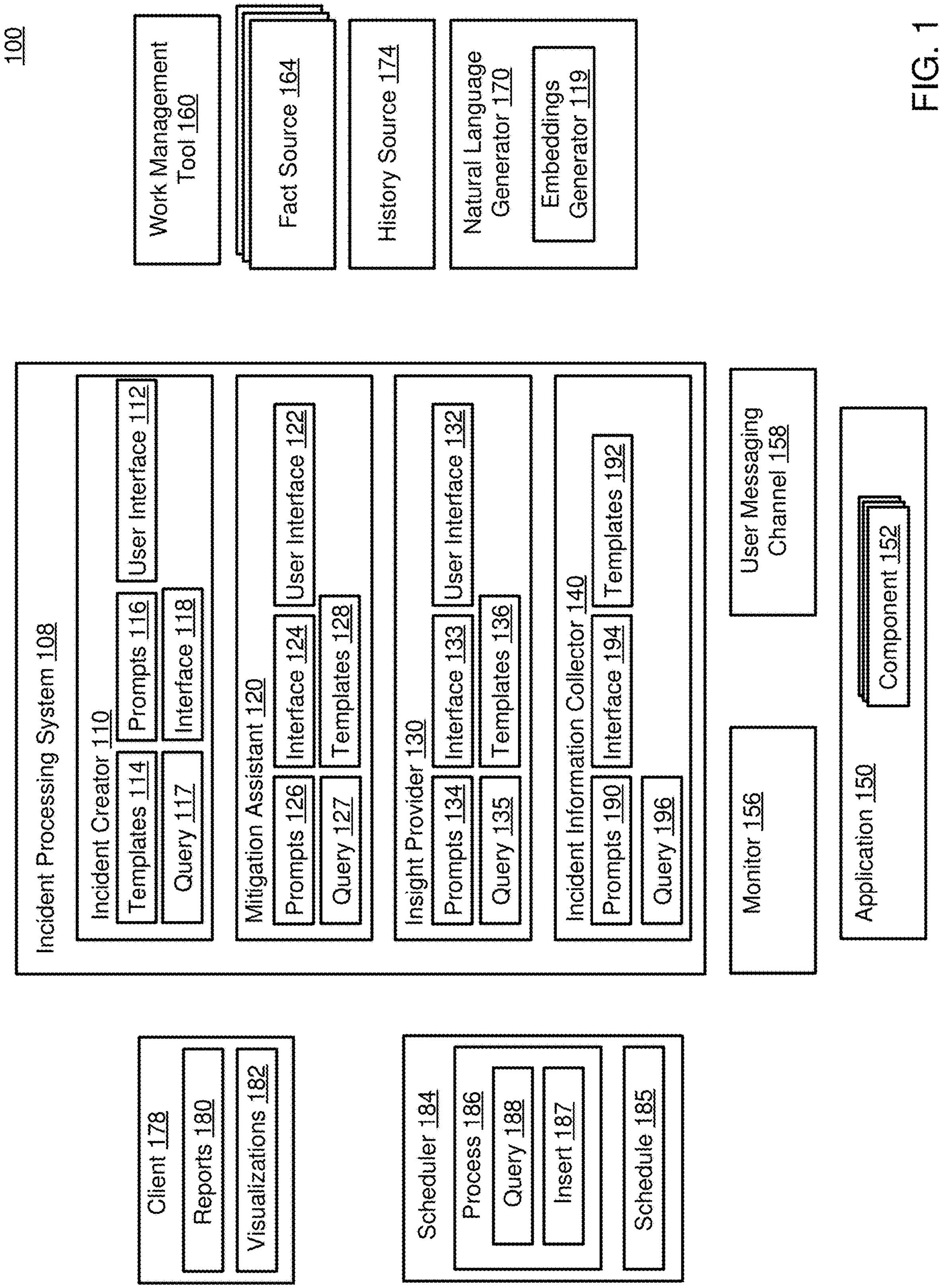
FIG. 1 is a diagram of a computing environment having an incident processing system that can use a natural language generator to assist in software support tasks.

Software programs can be exceedingly complex. In particular, enterprise level software applications can provide a wide range of functionality, and can process huge amounts of data, including in different formats. Software is typically tested to varying degrees prior to making software available for productive use. Further testing can be performed as part of software updates or software maintenance.

Despite this testing, software bugs or unexpected software behavior can still occur once software is "released." In some cases, software bugs may not be apparent until particular data is processed by the software, until multiple features are used together in a particular way, or until a particular set of operational conditions occurs.

It is desirable to identify software bugs or performance issues as quickly as possible, as well as to start and complete a process to resolve such bugs or issues. This is particularly important for software that supports the day-to-day activities of business enterprises, among others, as downtime can cause serious issues. Often, a software company is responsible for addressing software issues that might occur during customer use, and there may be contractual obligations regarding how quickly issues are to be identified and resolved.

Typically, software support engineers are responsible for becoming aware of an incident and indicating incident resolution, which can include creating an incident record and obtaining and analyzing information relating to the issue. This analysis can include reviewing data provided regarding the issue (such as error messages or logs, or performance information) and information provided, such as by a user/client, regarding the issue or comments made by other support personnel who may be involved in resolving the incident. The software support engineer determines how to address the issue, implements the resolution, and then closes the incident record. Various reports may be generated to document a software company's performance in identifying and resolving issues in a timely manner.

Despite best efforts, humans may neglect to perform certain tasks, or perform tasks in a particular way, which can interfere with task completion, as well as evaluating task completion. Generating incident reports can be time consuming and subject to errors. In addition, resolving incidents can depend on a particular software support engineer, their knowledge and experience, and their ability to recall and apply that knowledge and experience in resolving an incident. If the software support engineer lacks the appropriate knowledge or experience, or fails to apply it, it may take longer to resolve an incident, and then the incident may not be resolved as well as it might otherwise be. Accordingly, room for improvement exists.

Consider the creation of an incident record or report. A user may neglect to complete certain information, or may enter incorrect information, or even enter correct data in an incorrect format. For example, it may be desirable to track how long it took to resolve an incident. If the dates are manually entered by a user, and are not provided in the expected format, it may not be possible to automate the duration calculation, or such a calculation process may produce erroneous results. In addition, creating an incident report can be time consuming, as it may require a software support engineer to spend significant amounts of time reviewing and processing various types of information about the incident.

In resolving an incident, a software engineer typically relies on their practical experience in dealing with prior incidents, as well as their general knowledge of the programs they are supporting. However, there may be situations that a software support engineer has not encountered before, or has simply forgotten. While details about prior incidents may be available that could be used to provide, or at least suggest, a resolution to an incident, it may very difficult and time consuming to identify and comprehend these reports, particularly when the software support engineer is under pressure to quickly resolve an incident.

As discussed, companies often track their overall performance in handling software incidents, such as to help ensure they are complying with customer service agreements. Manually reviewing incident data can be particularly time consuming, and may fail to identify insights into the overall process, including identifying areas of improvement.

Disclosed techniques can help with one or more of these issues. Generally, disclosed techniques provide software components that can assist with one or more of the above tasks with the assistance of a natural language generator (NLG), such as a large language model (LLM).

In one aspect, the present disclosure provides an incident creator component that can assist in generating an incident report. When an incident is identified, a user can trigger the incident creator. The incident creator can use initial information about an incident, such as a software component associated with the incident, version information, or identifiers of data sources from which information about an incident can be obtained, to obtain additional information that can be used in generating an incident report. Data sources can include databases, as well as communication or collaboration tools, such as SLACK (Slack Technologies, Inc).

Once the additional information has been retrieved, the incident creator component can create an incident report. In some cases, the incident creator component can automatically save/activate the incident report. In other cases, a draft incident report is created and presented to a user, and the user can then choose to save the incident report, optionally after modifying it. The incident report can be associated with a work management tool, such as JIRA (Atlassian Corporation Plc.).

The incident creator component can use a natural language generator. For example, the natural language generator can be provided with information that can be synthesized to create an incident report. Specific prompts or report templates can be used with the natural language generator to help provide responses in a desired format. In some cases, the natural language generator can assist in other ways, such as formulating queries to obtain information about/relevant to an incident to one or more fact sources. The incident creator component can also facilitate actions regarding an incident, such as alerting software engineers who may be responsible for resolving an incident (and who may, or may not be, the same as a user who triggered the incident creator component).

Users can trigger a mitigation assistant to obtain help in resolving an incident. For example, a user can request suggestions on how to resolve an incident. The mitigation assistant can provide a prompt to a natural language generator to generate suggestions, where the natural language generator can, for example, call functionality to identify similar issues that may have previously occurred, and analyze provided suggestions that might resolve the incident. The mitigation assistant can provide the natural language generator with an incident report for the current incident or an identifier of the current report, as well as providing additional information or information that can be used to retrieve such additional information.

Once an incident has been resolved, it can be useful to review the overall context of the incident to perform a "postmortem" analysis. This type of analysis can help improve incident handling processes going forward. A postmortem analysis might include information such as a timeline of events for an incident, identifying root causes of an incident, and lessons learned (such as areas for improvement, gaps in processing or procedures, or ways to strengthen the resilience of a software program or a system on which it executed). The postmortem analysis can also include developing action items, such as to address any root causes, or to improve processes such as monitoring and altering systems, as well as assigning responsibilities and timelines for any follow up items.

Postmortem analysis can also be carried out for incidents over a particular time period. This type of postmortem analysis can include items such as a number of incidents observed over the period, a mean or average resolution time, outage times, affected components, affected customers/users, as well as root causes and lessons learned from incidents over the time period. In some cases, a software support team may have contractual obligations or targets to meet, and the postmortem analysis can include summarizing how much of a "budget" was used during a time period, or how much remains after a time period.

Disclosed techniques can also assist in data collection processes. For example, automated processes can be defined to retrieve information about incidents, such as from a work management tool. The information can be provided to a natural language generator, which can parse the provided information, including formatting for storage or generating commands to cause the data to be inserted into another data source, such as by generating SQL INSERT statements. Having the natural language generator parse the information can help ensure the consistency and accuracy of information. For example, the natural language generator can ensure that dates are maintained in a common format, including so that incident durations can be accurately calculated.

Example 2)—Example Computing Environment with Incident Processing System

FIG. 1 illustrates a computing environment 100 in which disclosed techniques can be implemented. The computing environment 100 includes an incident processing system 108. The incident processing system 108 is shown as including a variety of components, including an incident creator 110, a mitigation assistant, 120, an insight provider 130, and an incident information collector 140. Techniques according to the present disclosure can include an incident processing system 108 that includes any combination of the components 110, 120, 130, 140, including having a single component or including all components.

The incident processing system 108 can be in communication with information sources that identify that an incident exists, and that an incident report should be created and an incident resolution process initiated. For example, incidents can be associated with a software application 150, and in at least some cases, a particular component 152 of, or used by, the software application. While a component 152 can be specific to a particular application 150, in other scenarios a component 152 can be used by multiple software applications, where an issue with a component can affect multiple applications that use the component or a single such application.

One information source is a monitor 156. The monitor 156 can be configured to monitor performance, functionality, or availability of an application 150 or component 152 thereof, including monitoring a computing system or environment in which the application is executed. A monitor 156 can perform actions such as monitoring resource use of an application 150 or component 152, or the computing system or environment in which the application or component executes. If resource use, for example, exceeds a threshold, an alert can be generated, which can trigger incident creating and resolution processes. Similarly, if an application or application feature becomes unavailable, or malfunctions, an alert can be generated.

The monitor 156 can also perform actions such as tracking application performance metrics (such as a time needed to complete a particular action), and trigger an alert if these metrics exceed particular boundaries or thresholds. The monitor 156 can further perform actions such as monitoring error logs or messages, or other types of logs or messages that can be analyzed to see if alert criteria are satisfied. Although shown as a separate component, in some implementations the monitor 156 can be integrated into the application 150 or a particular component 152.

In other cases, information about software bugs or performance issues that may trigger an incident can be provided through one or more user messaging channels 158. User messaging channels 158 can include communication channels such as text messages or emails, or entries made by customer support personnel in response to user chat sessions or telephone calls. User messaging channels 158 can also include communications such as submissions of web forms, or feedback or service requests that might be submitted directly through an application 150.

In addition to use in triggering the creation of an incident, the application 150, component 152, monitor 156, or user messaging channels 158 can provide information for other disclosed techniques, such as for information that can be used in completing an incident report or for obtaining suggestions on how an incident might be resolved.

The computing environment 100 can include one or more work management tools 160, such as JIRA. The work management tool 160 can be used in creating and completing incident reports, as well as sources of incident information that can be used in obtaining suggestions on how an incident under review might be addressed.

The computing environment 100 further includes one or more fact sources 164. Fact sources 164 can be used to obtain information that can be used in obtaining information used in an incident report, or in developing suggestions for resolving an incident. Fact sources 164 can include one or more databases or similar data storage mechanisms. A database, for example, can store information such as code for an application 150 or component 152, dates an application 150 or component 152 was last updated, information about software support engineers and their particular roles, and tools used in responding to incident reports. For example, a collaboration tool such as SLACK can serve as a fact source 164, where, for example, information in a SLACK conversation can include information such as when an issue associated with an incident first appeared or when it was resolved, as well information about steps taken to try and resolve the incident and information about software support engineers involved in this effort.

The incident creator 110 is configured to create, or assist in creating, incident reports. In some cases, the incident creator 110 is triggered to generate an incident report in response to a communication from the monitor 156 or the user messaging channels 158. In other cases, the incident creator 110 can be triggered by a user, such as by a software support engineer. For example, the incident creator 110 can include a user interface 112 for interacting with the incident creator, including in requesting the creation of an incident report and in confirming that a draft incident report created by the incident creator should be saved/activated, such as saving the incident report in the workload management tool 160.

The incident creator 110 can include templates 114. The templates 114 can be templates corresponding to an incident format used by the workload management tool 160. The templates 114 can be used in generating prompts 116 that will be provided to a natural language generator 170 (such as large language models available from OPENAI).

Typically, a request to create an incident report includes information regarding the underlying issue, or information that can be used to retrieve such information. For example, an identifier of information in a fact source 164 can be provided, or information identifying a particular message/alert sent by the monitor 156 or through the user messaging channels 158. The information can be used to generate the incident report, as well to retrieve additional information for the incident report. For example, fact sources 164 can be reviewed to obtain information about the software or component associated with the request, such as version or update information. In some cases, this type of information can be stored in a database. Fact sources 164 can also include discussions that may have occurred using a collaboration tool.

In some cases, queries 117 to obtain information from fact sources 164 can be generated automatically from information provided in a request to generate an incident report. That is, the incident creator 110 can include functionality to parse a request to create an incident report and use this information to complete predefined query templates. However, formulating such queries in an automated manner can be complicated, as the nature of the information provided in a request to create an incident report may not follow a strict format/lend itself to easy, accurate parsing. Accordingly, information about the incident, including the incident creation request, can be submitted to the natural language generator 170, such as by using the provided information with one of the prompts 116. For example, a prompt 116 may contain general instructions to the natural language generator 170 regarding the particular task to be performed. An example prompt is:

Please generate queries to retrieve relevant information in the following alert.

Available fact sources are source A and source B, which can be reached at URL1 and URL2. Please structure queries for source A in format 1 and queries for source B in format 2.

The incident creator 110 can cause the queries 117 to be executed, and thereby obtain additional information that can be included in the incident report. The information provided in a request to generate an incident report, or from a message that triggers the creation of an incident report, as well as information returned in response to the query 117, can be subject to errors. For example, the information can be not correctly formatted for the incident report, not relevant to the incident report, or not clearly delineated in the incident report. Accordingly, the prompts 116 can include a prompt that requests the natural language generator 170 to perform actions such as extracting information from a larger set of information provided, summarizing such information, and providing a response in a format of a template 114.

As an example of how information might be extracted from the larger set of information, consider that often it is desirable to include in an incident report when a particular issue first arose, not just when the incident report was created. Finding this information in the larger set of information may be difficult, as it may require analyzing the information rather than simply pulling out a date that was already specifically identified. Although in some cases a prompt 116 can include all of such tasks, or multiple such tasks, it can be beneficial to create separate prompts for different subtasks related to creating an incident report. An example prompt 116 for extracting a time a problem first arose can be:

Please analyze the attached log files and conversation and provide the earliest date and time incident number 1234 occurred and record this as the issue start time.

An example prompt 116 for creating an incident report can be:

Please review the information provided below and complete the incident reporting form having the following format. Please leave any field you cannot answer blank. Please only provide the competed template.

The mitigation assistant 120 can be used to provide software support engineers with information that may be able to assist them in resolving an incident. The mitigation assistant 120 can receive a request for a mitigation suggestion, such as through a user interface 122. The request can include information about a particular incident, such as including content of an incident report or an identifier of an incident report.

The mitigation assistant 120 can include functionality to search for historical records, such as incident reports, in a history source 174 that may have information that could be used to suggest possible actions to resolve a current incident. In a particular example, the history source 174 is a database, and in more particular implementations the history source is a vector database.

Incident reports, such as those associated with the work management tool 160, can be converted into a form that allows for semantic searching to be performed. For example, incident reports from the work management tool 160 can be converted to a set of embeddings, such as using a technique such as DOC2VEC or other types of natural language processing techniques. Input to the mitigation assistant 120, such as a current incident report, can also be used to generate a set of embeddings, and those embeddings used to find prior incident reports with similar prior embeddings.

In some cases, the mitigation assistant 120 provides, or provides access to, functionality for generating such embeddings (for example, embeddings generator 119), such as through an interface 124. In other cases, the natural language generator 170 can provide access to such functionality, where the natural language generator may also be accessed through the interface 124, and a request to perform such actions can be included in a prompt 126. For example, in responding to a request to generate a mitigation strategy, the natural language generator 170 can call functionality to generate a set of embeddings for a particular incident report, and then can generate a query 127 to be executed using a vector database to identify embeddings for sufficiently similar, previously processed incident reports. In other cases, the mitigation assistant 120 submits a query 127 to be executed using the vector database.

The mitigation assistant 120 can include a prompt 126 that requests the natural language generator 170 to analyze retrieved historical incident reports and determine steps that might be relevant to resolving a current incident. In some cases, the prompt 126 can include, or specify, a particular template 128 in which suggestions should be provided, or otherwise provide examples of the type of information that should be included in a response.

The insight provider 130 can be used to provide information regarding one or more particular incidents, at varying levels of detail. For example, the insight provider 130 may perform a postmortem analysis for an incident to try and identify ways in which the incident could have been handled more efficiently, or to identify issues that happened during handling of the incident that might be addressed to help prevent, or provide faster resolution, of future incidents.

Often, it is desirable to review summary information for incident handling over a time period, and this information can also be generated using the insight provider 130. It may be useful to track the total number of incidents handled over a time period, as well as information about the associated applications 150 and components 152. It may also be of interest to have information about the average, mean, longest, or shortest time to resolve incidents, any software outages associated with incident handling, or how software outages or incident handling time may relate to any service agreements with a particular user/customer.

A request for summary information can be received by the insight provider 130, such as from a user through a user interface 132. The request can include information such as a particular type of report that is desired, for example, whether a postmortem on a specific incident is desired, an overview of incident handling over a time period, or a calculation of how incidents over a time period may affect an "error budget" an organization has with a user/customer.

The insight provider 130 can access various data sources, such as through an interface 133, in response to a particular request, such as a request provided through a user interface 132. Depending on implementation, the insight provider 130 can access the workload management tool 160 or the history source 174 to obtain the content of incident reports, or information that may have been generated summarizing an incident report or a set of incident reports.

In gathering the information, the insight provider 130 can access one or more defined queries 135. When information is retrieved, it can be provided in a prompt 134 that is submitted to the natural language generator 170. The prompt 134 can provide instructions to the natural language generator 170 as to the task to be performed. In some cases, a template 136 can be provided in the prompt 134 to assist the large language model 170 in performing a task and providing the response in a desired format. Information generated by the insight provider 130 can be provided to a client 178, such as in a report 180 or visualization 182.

The incident information collector 140 performs actions such as gathering, formatting, or storing information relating to incident reports, including in a manner that can be used by other components of the incident processing system 108. For example, the incident information collector 140 can process information of the work management tool 160, including so that at least a portion of this information can be stored in the history source 174.

In a particular implementation, a scheduler 184 periodically, such as according to a schedule 185, executes processes 186 to gather incident information, cause the information to be processed in a particular manner, and then cause the information to be stored, such as in the history source 174. As an example, when the history source 174 is a relational database, a process 186 can include insert operations 187 that cause records to be inserted into the database. The scheduler 184 can include queries 188 that can be executed, such as by the work management tool 160.

Information retrieved from the work management tool 160 can include, for example, incident reports and optionally supporting information (for example, information in a fact source 164). Only a portion of this information may be desired to be stored in the history source 174. Accordingly, the scheduler 184 can call the incident information collector 140. The incident information collector 140 can then send at least a portion of this information to the natural language generator 170, in conjunction with a prompt 190. The prompt 190 can include information such as an instruction for a task to be performed on incident information, each as extracting, formatting, or summarizing particular data. A prompt 190 can also specify a template 192 in which results should be provided.

The incident information collector 140 can communicate with the natural language generator 170, and optionally other components, such as the embedding generator 119, the work management tool 160, or a fact source 164 using an interface 194. In some cases, rather than receiving information to be included in a prompt 190 from the scheduler 184 for use with a prompt 190, the scheduler sends information to the incident information collector 140 identifying what information should be obtained, and the incident information collector can obtain the information by querying the appropriate data sources, such as using queries 196.

Example 3—Example Operations Using Incident Processing System

Figure 2:
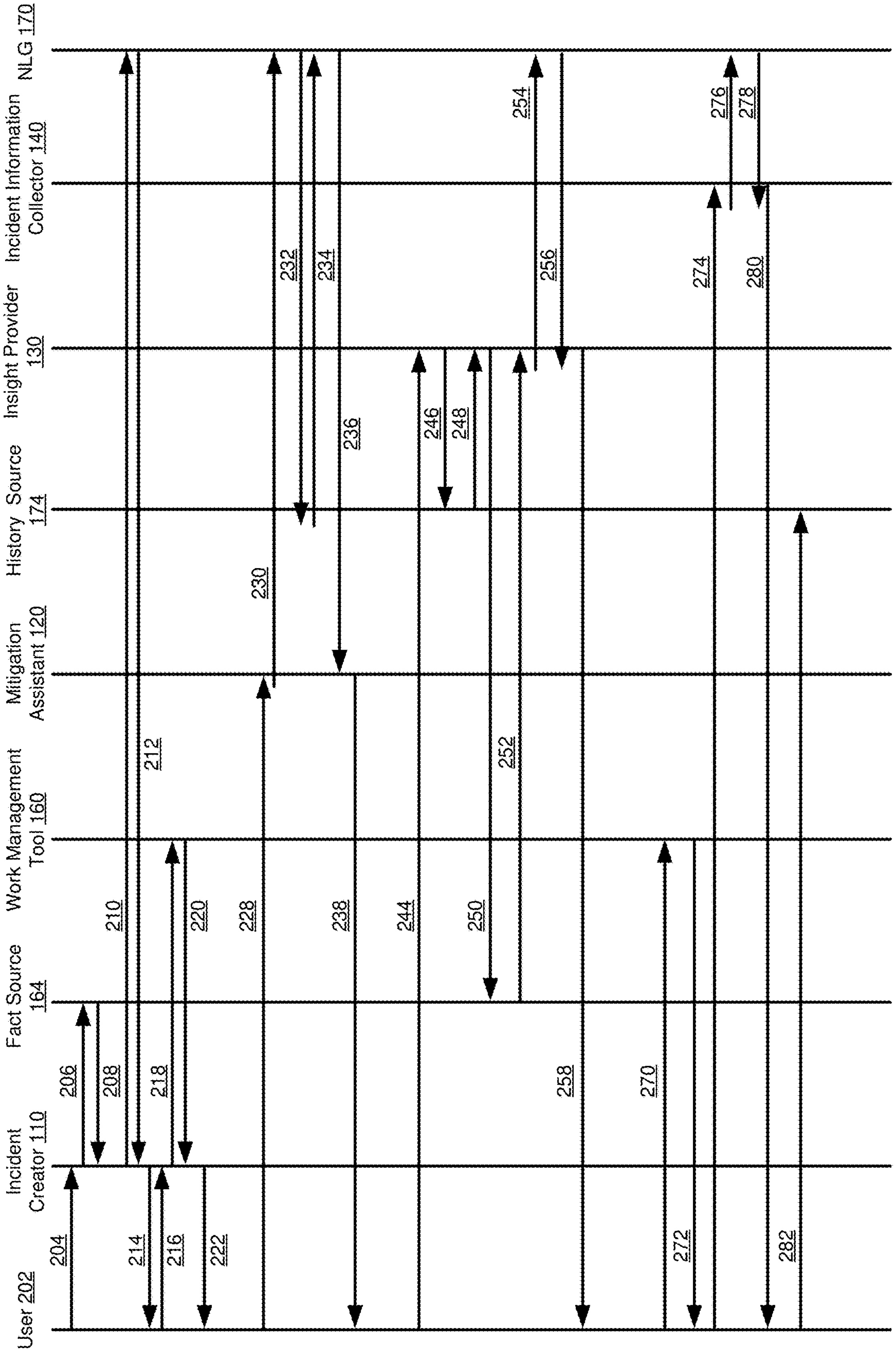
FIG. 2 is a timing diagram illustrating operations performed by various components of the computing environment of FIG. 1, and their interactions, in assisting in software support tasks.

FIG. 2 provides a timing diagram of various operations that can be performed using components of the computing environment 100 of FIG. 1, including the incident processing system 108 and the natural language generator 170. For convenience of presentation, FIG. 2 illustrates operations involving the incident creator 110, the mitigation assistant 120, the insight provider 130, and the incident information collector 140. However, it should be appreciated that disclosed techniques can implement operations of a single component, or of multiple or all components, of the incident processing system 108. Further, although the timing diagram illustrates particular operations for the components 110, 120, 130, 140 in a particular order, the operations are not included to imply a sequence between operations for such components, as operations for the components can occur in different orders, and some operations for different components can be performed concurrently. That is, while operations for a given component 110, 120, 130, 140 are associated with an order, components are not necessarily sequenced with respect to one another as shown.

A first set of operations is described for the incident creator 110. At 204, an incident creation request is provided by a user or a computing process 202. The creation request can be associated with a fact source, such as a SLACK thread, or a result of an alert provided by the monitor 156. In response to receiving the request, the incident creator 110 sends a query (such as a query 117 of FIG. 1) to one or more of the fact sources 164 at 206. For example, the query can request content of the SLACK thread or information regarding particular code or a particular software component associated with an error, or for log information. The fact source 164 returns the request information to the incident creator 110 at 208.

At 210, the incident creator 110 processes at least a portion of the information received from the fact source 164 and provides it, in connection with a prompt (such as a prompt 116) to the natural language generator 170, such as using an interface (such as the interface 118). The prompt can be produced according to a template (such as the template 114), or can specify the template as part of the prompt (for example, where the template is provided to the natural language generator 170 as an example of what content a response should contain and a format in which it should be provided).

In this particular example, the prompt and the template can request that information be provided in an incident report. The incident report, optionally along with other information, can be provided from the natural language generator 170 to the incident creator 110 at 212. Optionally, at 214, the incident creator 110 sends a draft incident report to the user 202. The user 202 can review the draft incident report, and optionally make additions or corrections. The user 202 can then approve of the draft incident report for creating in a communication 216 to the incident creator 110. The incident creator 110 causes the incident report to be created/saved at 218, such as by communicating with the work management tool 160. Control can then return to the incident creator 110 from the work management tool 160 at 220, optionally with the provision of a success or failure response. The incident creator 110 can optionally perform additional activities, such as, at 222, providing a result (such as success or failure message) back to the user or computing process 202, as well as, for example, generating alerts to software support engineers who may be responsible for responding to a software incident.

Turning to operations for the mitigation assistant 120, at 228, the user 202 sends a request to the mitigation assistant. The request can include an incident report, or an identifier for an incident report, or other information that includes, or can be used to obtain, information about the nature of the incident (for example, information about the nature of an error, log information, or software component/version information). In one implementation, the mitigation assistant 120 incorporates the information into a prompt (such as a prompt 126) that is sent to the natural language generator 170 at 230. The prompt can include instructions for the natural language generator 170 regarding the nature of the requested task, and optionally a format in which a response is desired, or at least the desired contents of the response.

As at least part of responding to the mitigation assistance request 120, the natural language generator 170 can communicate with the history source 174, such as in a communication 232. The communication 232 can request a search, such as a semantic search, of the history source 174. As explained, the history source 174 can include embeddings for information about prior software incidents, such as incident reports, and the natural language generator 170 can cause a set of embedding for a current software incident to be used in searching the history source 170. Alternatively, the embeddings can be generated by the history source 174, or can be provided in the communication 230 from the mitigation assistant 120 (where the mitigation assistant can have, can have access to, an embeddings generator). In either case, the embedding can be generated by the embeddings generator 119. In addition, or alternatively, the history source 174 can be a source that does not use embeddings (for example, using a relational database or other database in place of a vector database), and the search can be based on, for example, keywords for different errors for particular applications 150 or application components 152.

The history source 174 sends query results to the natural language generator 170 in a communication 234. The natural language generator 170 then analyzes the retrieved results to develop suggestions on how to resolve a current software incident, including converting embeddings associated with the query results (representing prior incidents) to human-readable statements. These recommendations are provided from the natural language generator 170 to the mitigation assistant 120 at 236, in response to the prompt 126. The mitigation assistant 120 then provides the suggestions to the user 202 in a communication 238.

Operations for the insight provider 130 are now discussed. At 244, a user 202 provides a request to the insight prover 130. The request can indicate the particular type of information that is desired, such as a postmortem analysis for a particular software incident, a report providing metrics regarding incident handling over a period of time, or a report of how much "error budget" has been used, or remains, for a particular period.

The insight provider 130 can then select an appropriate query (such as a query 135) to retrieve information from a history source 174 through a request 246. For example, the history source 174 can store selected information about incidents, such as in a relational database. The information stored in the history source 174 can be a subset of information in an incident report, or can include at least some information determined from an incident report. Information from the history source 174 is returned to the insight provider 130 at 248. The insight provider 130 can optionally retrieve additional information from a fact source 164 at 250, such as depending on the nature of a request. For example, for a postmortem analysis for an incident, it may be desirable to retrieve a SLACK thread used in resolving the incident. The requested information is provided to the insight provider at 252.

The insight provider 130 can then select an appropriate prompt (such as a prompt 134) for a requested task, and provide the prompt and the appropriate information retrieved from the history source 174 or the fact source 164 to the natural language generator 170 at 254. The natural language generator 170 provides a response to the insight provider 130 at 256, which is then provided to the user 202 by the insight provider at 258.

Turning to the incident information collector 140, an automated process 202, such as a process 186 of the scheduler 184, obtains incident information by submitting a request 270 to the work management tool 160. The request 270 can be sent using an interface (such as the interface 194), and can include a query (such as a query 196) to be executed on the work management tool 160. The information retrieved from the work management tool 160 can include information such as timestamps (such as incident start and incident end times), incident summary information, information about how an incident was mitigated, and any impacts, such as software or system outages, caused by the incident. The information is returned from the work management tool 160 to the automated process 202 at 272.

The information retrieved from the work management tool 160 may not be suitable for storage. For example, it may be desired to extract particular information, such as the timestamps, from the information received from the work management tool 160. Accordingly, automated process 202 calls the incident information collector 140 at 274, including sending the information to be processed. In turn, the incident information collector 140 can provide the information in a prompt (such as a prompt 190) to the natural language generator at 276. The prompt 190 can include a template (such as a template 192), where the template can help specify what task is to be performed and how results should be provided. Results of processing the prompt by the natural language generator 170 are returned to the incident information collector 140 at 278, and then from the incident information collector 140 to the automated process 202 at 280.

The information provided by the natural language generator 170 can be information to be stored in the history source 174. Accordingly, the response provided by the natural language generator 170 can be extracted information that is suitable for insertion into history source 174 (such as in a format where it can be used with standardized insertion/write instructions), or can be insertion/write instructions that can be executed by the history source. At 282, the automated process 202 issues suitable commands to cause the incident information to be stored in the history source 174.

Example 4—Example Incident Information

FIG. 3 provides an example incident report 300. The incident report 300 can represent an example report that the incident creator 110 of FIG. 1 can assist in creating, and illustrates how various elements of the incident report can influence a prompt or template used in association with a large language model for incident report creation. The incident report 300 also represents information that can be used in storing incident information in association with the incident information collector 140 of FIG. 1.

More specifically, the incident report 300 includes summary elements 302, 304, 306, 310 indicating, respectively, a title of the incident (which can be a brief description of the error encountered), a priority assigned to the incident, an identifier of a user or process reporting the incident, and a date the incident was reported. Note that the date that the incident was reported 310 can differ from a date or time that the incident began, as shown by element 312, where element 314 indicates an incident end time (which can correspond to the date when the incident was resolved, which can differ from a time that the incident report was completed). An element 308 provides information about a software component associated with the incident, which can be useful in providing context about the incident, such as for use in determining code that might be responsible for an incident, retrieving appropriate version information, or identifying particular software support engineers to be notified of the incident. This information can also be used for reporting purposes, such as by the insight provider 130, including in providing statistics about software support time or outages associate with a component, or collecting data across multiple incident reports that might suggest ways to proactively avoid further incidents with the component.

Element 320 provides a more detailed summary of the identified issue, while element 322 provides a list of actions that cause the error to be produced. Elements 324 and 326 describe, respectively, expected and observed behavior. Element 330 provides an indication of the impact of the software incident, such as affected users or business processes, as well as details regarding the severity of impacts.

Element 334 provides information about an operating environment of a computing system where the software incident occurred, while an attachment section 336 can list, and in some cases link to, additional documentation or description of the problem, such as screenshots showing erroneous behavior or error or other types of logs.

Additional information can be provided in a section 340, such information regarding any actions that might be related to the software incident (such as code updates), or aspects of an application or operating environment that are known to be stable, and possibly less likely to be the source of errors The example incident report 300 can represent a finalized version of an incident report, and so includes a section 344 describing steps that were taken to resolve the incident, as well as a section 346 that provides insights gained during incident resolution or other action items (which can correspond to a postmortem analysis). Sometimes software issues can be interrelated, such as when an error with one aspect of a software application causes an error in another aspect of the software application. Accordingly, any related incident reports can be identified in a section 348, and any additional comments can be provided in a section 354.

As described, a variety of information can be provided to a natural language generator, which can the analyze the information to complete at least portions of the incident report 300. In some cases, the incident may not yet have been resolved, in which case the incident report 300 can be completed to the extent information is available. The incident report 300 can later to be revised to include the remaining information, such as the resolution steps of section 344.

Providing the headings of the various elements of the incident report 300 can assist a natural language generator in understanding what output is desired (completing the information in the incident report), and thus the tasks to be performed. The example elements in the incident report 300 can similarly act as a template as to how a response should be output. A prompt to the natural language generator can include more detailed instructions as to the overall task to be performed, including what information should be provided in the various elements of the incident report 300, as well as instructions on how the task should be performed, such as data to be reviewed and suggestions on how the data should be processed. In some cases, an at least partially completed incident report 300 can be provided to further help the natural language generator understand the nature of the task and the desired output.

FIG. 4 illustrates two example incident alerts or notifications 400, 450. Alert 400 represents an alert automatically generated by a monitoring process, while alert 450 represents an alert manually provided by a user. The alerts 400, 450 can trigger the creation of an incident report, such as an initial version of the incident report 300. The alerts 400, 450 can also represent content that is available in a fact source, such as a fact source 164 of FIG. 1, and which can be provided to a natural language generator in performing various disclosed techniques, including the creation of an incident report. In particular, a natural language generator can process the content of the alerts 400, 450 in determining an at least putative incident start time, although other information available to the natural language generator may identify an earlier time.

FIG. 5 illustrates a type of content available from a fact source 164, in this case a conversation 500 using SLACK or a similar collaboration tool. The conversation 500 can be retrieved from a fact source and provided to a natural language generator in generating an incident report, such as the incident report 300 of FIG. 3. The conversation 500 includes identities of software support engineers working on a resolution, as well as providing content of their conversation and times associated with various posts. Again, this information can be provided to a natural language generator, which can process the conversation to obtain information such as incident start and end times, the nature of the software incident, and steps taken to resolve the incident.

The conversation 500, as shown, runs from the start of an incident through incident resolution. When only earlier entries in the conversation 500 are available, before the incident has been resolved, the natural language generator can extract information about the software support engineers involved incident resolution, including to assign them responsibilities in an incident resolution process (and for which alerts can later be generated).

The conversation 500 can also be analyzed in processes involving the insight provider 130 of FIG. 1. For example, the conversation 500 may have relevant details for generating insights that are not included in an incident report.

FIG. 6 provides an example mitigation suggestion 600 that can be provided by the mitigation assistant 120 of FIG. 1. The mitigation suggestion 600 can be generated using information regarding a current incident, such as a current version of an incident report, and optionally other information, such as information from one or more fact sources 164 of FIG. 1 (which can include a SLACK conversation, such as the conversation 500).

The mitigation suggestion 600 includes a summary 610 of the current incident, a summary 620 of issues that may be the source of a problem, and specific recommended actions 630 to be taken to try and resolve the current incident. As described, the summary 620 and recommended actions 630 can be based on the analysis of prior incident reports by a natural language generator, such as incident reports identified using keyword searches or using semantic searching, including searching a vector database having embeddings generated for prior incident reports.

FIGS. 7 and 8 illustrate example table schemas 700, 800 for storing incident information. In particular, the table schema 700 can be used to store selected, structured information from an incident report. Tables organized according to the data schema 700 can serve as a history source 174 of FIG. 1. Thus, data in the form of the table schema 700 can be used by the mitigation assistant 120, as well as being used by the insight provider 130 of FIG. 1. For example, information in the schema 700 can be used to generate a postmortem analysis of a specific incident, or can be part of a postmortem for a period of time that includes particular information in the schema. Information from the schema 700 can be processed by a natural language generator, including for use in generating a report 180 or visualization 182 of FIG. 1.

The schema 800 of FIG. 8 is more specifically defined for storing start and end times for incidents, such as for use in calculating incident handling metrics over a time period, including for use in determining compliance with service agreements.

Example 5—Example User Interface with Incident Handling Metrics

FIG. 9 presents an example display 900 of incident handling metric information 910, as well as a query 950 that can be used in generating or retrieving the metric information. The information in the display 900 can be used to identify incidents having longer resolution times. The information in the display 900, or retrieved from the query 950 or a similar query, can be used to generate aggregated metrics, such as a mean or median resolution time over a time period. Similarly, duration information for incidents in the display 900 can be aggregated to determine a total duration of active software incident resolution processes, which can then be compared with goals/performance targets, including those defined in customer agreements. The query 950 can be executed against data stored in the schema 700 of FIG. 7 or the schema 800 of FIG. 8.

Note that entry 914 has a negative duration. This can result from incorrectly determined incident start and end times, and illustrates an advantage of disclosed techniques. For example, different data sources may store dates in different formats, and it can be difficult to account for such differences in "fixed" data processing code. Similarly, and potentially more problematic, documents generated for software incidents, such as in incident reports or communications using collaboration tools, may not enforce data entry in a particular format, and so, again, this can result in duration calculation errors, such as incidents having negative durations. The "randomness" of user date entry formats may make it even more difficult to develop robust data cleansing/processing code. However, natural language generators can be very adept at identifying dates in a wide variety of formats, and then converting them to a common format.

FIG. 9 illustrates summary information over a time period, in the form of an outage "budget" 920 having a duration that can be defined in a service level agreement. A sum of outage durations over the time period 922 is provided, omitting entry 914 for clarity of presentation. The sum 922 can be subtracted from the budget 920 to provide a remaining permitted outage amount 924.

Example 6—Example Code

A particular implementation will be described for extracting incident information, such as in a format that can be stored in a relational database, such as in a table having the schema 800 of FIG. 8. As part of the extraction, data is submitted to a natural language generator, such as a large language model, to extract incident start and end times and convert them to a standard format.

FIG. 10 illustrates example prompts that can be provided to a natural language generator. In this particular implementation, a MapReduce approach is used to help account for prompt token limits. That is, a corpus of incident data to be processed may exceed a single prompt token limit. As a first step, portions of the incident data are submitted in separate prompts to the natural language generator to perform data extraction. The results of these prompts can then be combined and submitted in a single prompt to the natural language generator to perform additional extraction/data processing tasks. If the combined result still exceeds the single prompt limit, the combined result can again be split into different prompts for the further data processing, such that related data is maintained within the same prompt. However, disclosed techniques can operate in a different manner, including the use of a single prompt for each of multiple processing tasks, or using a single prompt that combines multiple processing tasks.

FIG. 10 illustrates a map prompt 1010, which provides a general instruction to the natural language generator regarding the data exaction task. While the prompt 1010 can be useful, including for a variety of use cases, improved results may be obtained by providing more detailed instructions to the natural language generator, in the form of a "hint" prompt 1015. In some cases, when a process is executed, the general map prompt 1010 can be combined with the hint prompt 1015 for a specific use scenario to provide a combined map prompt that is then submitted to the natural language generator, along with the appropriate portion of the data corpus.

Here, the general map prompt 1010 instructs the natural language generator to analyze the provided data corpus and extract issue keys, component names, and incident start and end times, as well as providing information about the format of the data corpus. Note that at this point incident start and end times are to be extracted, but no specific format is specified, and so the natural language generator can extract start and end times in any format.

The hint prompt 1015 provides further details regarding the structure of the data corpus, including tokens that can be used to identify particular data to be extracted.

In a similar manner, FIG. 10 provides a general "reduce" prompt 1020, and a reduce hint prompt 1025 that can be combined with the reduce prompt. The reduce prompt 1020 instructs the natural language generator to extract particular information generated from the map process, as well as to convert the incident start and end times to a specific date format. The reduce prompt 1020 also instructs the natural language generator to generate database insert statements for the extracted/processes data.

The reduce hint prompt 1025 provides further details about how the data should be organized, such as determining whether an incident might be associated with multiple end times and organizing those times with respect to a corresponding incident start time. A reduce output format prompt 1030 provides more specific details about how the insert statements should be formatted. As with the general map prompt 1010, the general reduce prompt 1020 can be combined with different prompts, such as different versions of the reduce hint prompt 1025 or the reduce output format prompt 1030, depending on a specific use case.

Although not shown in FIG. 10, prior to a prompt being submitted to a natural language generator, either for a map phase or a reduce phase, the prompts generated as explained above can be combined with the appropriate data from the data corpus before submission to the natural language generator.

In FIG. 11, code 1100 provides a function for submitting a prompt, such as the prompts discussed with respect to FIG. 10, to a natural language generator. Note that the function defined by the code 1100 includes an input parameter for a prompt, so that different prompts can be processed using the function by submitting a specific prompt as an argument to the function.

FIG. 12A provides example code 1200 that includes a function 1210 that defines a query to retrieve incident data, such as from a table having the schema 800 of FIG. 8. In particular, the function 1210 retrieves information for incidents that have been resolved within a particular time frame. In FIG. 12B, example code 1230 can be called to retrieve issue keys for incidents resolved within a specified time period, and includes a call to the function 1210 of FIG. 12A. FIG. 12B also illustrates example code 1250 that can be called to insert incident data into a table, such as a table having the schema 800 of FIG. 8. For example, insert statements generated by a natural language generator, such as after extracting and standardizing incident start and end times, can be provided as arguments to the code 1250.

FIGS. 13A-13C illustrate example code 1300 extracting incident data from JIRA and processing it using a natural language generator. In FIG. 13A, a function 1308 retrieves JIRA information for a specified incident key and stores it in JSON format. The function 1308 then anonymizes the data, and checks to see if the data exceeds a token limit, such as a single prompt token limit for a natural language generator. If the token limit is exceeded, the function 1308 splits the information, the split information can be used in the MapReduce process described with respect to FIG. 10.

In FIG. 13B, code 1340 submits map and reduce prompts, along with data to be processed, to the natural language generator and receives results.

FIG. 13C provides code 1360 that implements the function 1308. The code 1360 includes a call to a function 1370, where the function determines a number of tokens in a text string, where in this case the text string is the information to be submitted to a natural language generator. Code 1360 divides this number by the token limit for the particular natural language generator being used to provide a number of "slices" into which the data should be divided. In this particular example, the quotient is rounded up when determining the number of slices. The code 1360 returns a list of strings corresponding to the slices.

The code 1360 is advantageous, including because it can help maximize the number of tokens submitted to a natural language generator in a given prompt, which can reduce the number of prompts/calls to the natural language generator, which can improve computing efficiency and reduce processing time.

Example 7—Example Operations

Figure 14A:
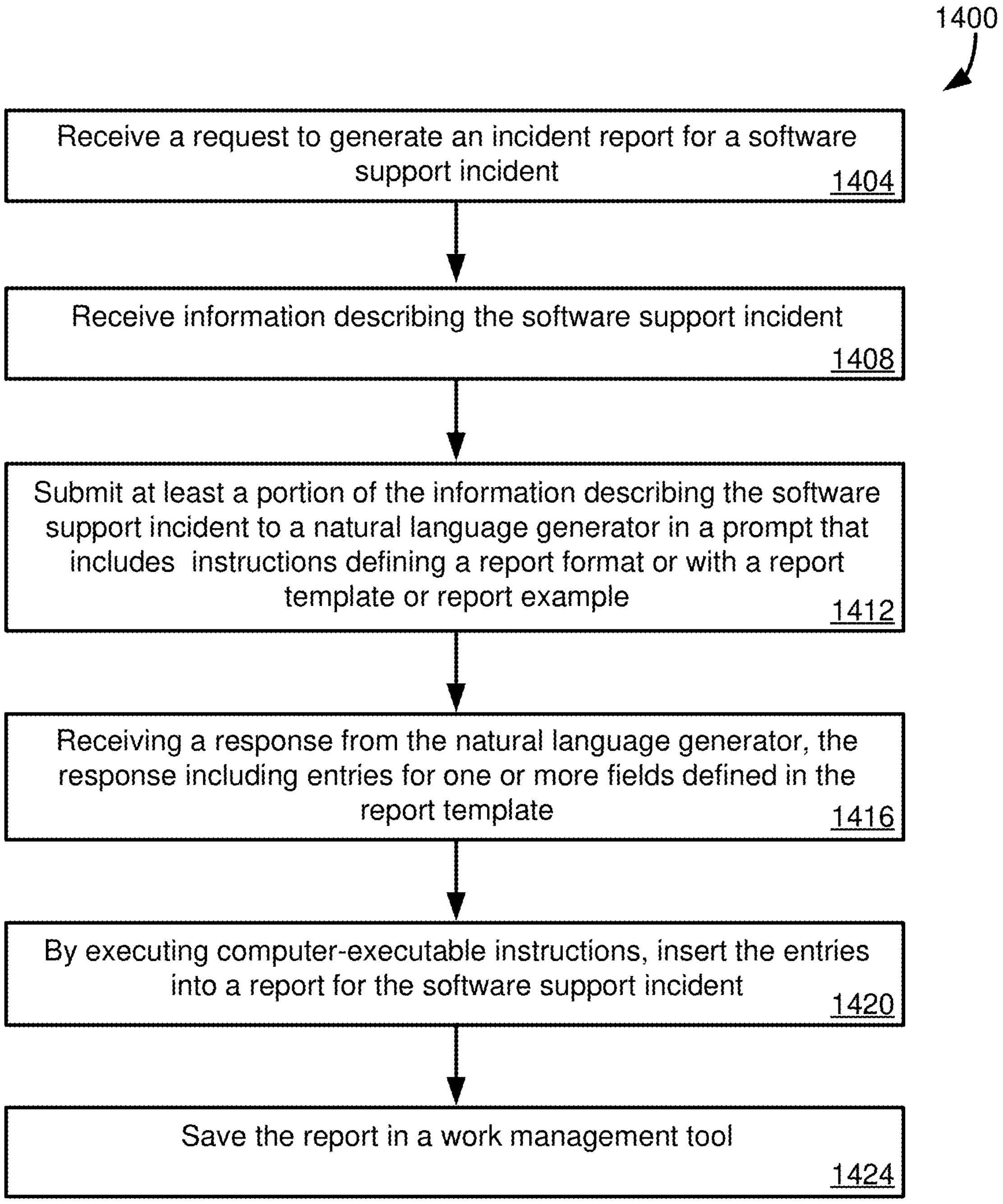
FIG. 14A is a flowchart of an example process of using a natural language generator to generate an incident report for a software support incident.

FIG. 14A is a flowchart of an example process 1400 of using a natural language generator to generate an incident report for a software support incident. At 1404, a request to generate an incident report for a software support incident is received. Information describing the software support incident is received at 1408. At 1412, at least a portion of the information describing the software support incident is submitted to a natural language generator in a prompt that includes instructions defining a report format or with a report template or report example. A response is received at 1416 from the natural language generator. The response includes entries for one or more fields defined in the report template. By executing computer-executable instructions, entries are inserted at 1420 into a report for the software support incident. At 1424, the report is saved in a work management tool.

Figure 14B:
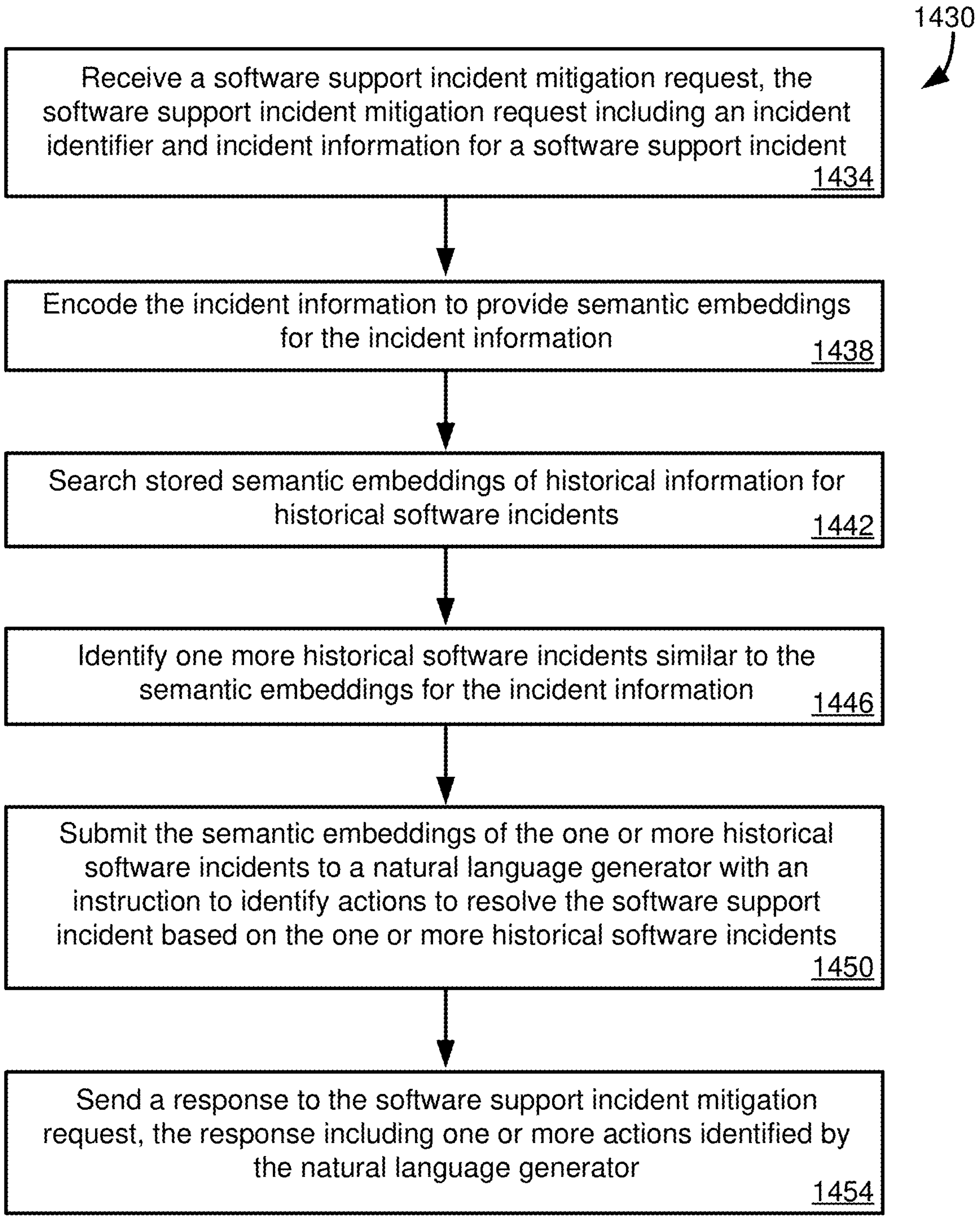
FIG. 14B is a flowchart of an example process of generating a software support incident mitigation request using a natural language generator.

FIG. 14B is a flowchart of an example process 1430 of generating a software support incident mitigation request using a natural language generator. A software support incident mitigation request is received at 1434. The software support incident mitigation request includes an incident identifier and incident information for a software support incident. The incident information is encoded at 1438 to provide semantic embeddings for the incident information. Stored semantic embeddings of historical information for historical software incidents are searched at 1442. At 1446, one more historical software incidents similar to the semantic embeddings for the incident information are identified. The semantic embeddings of the one or more historical software incidents are submitted at 1450 to a natural language generator with an instruction to identify actions to resolve the software support incident based on the one or more historical software incidents. A response to the software support incident mitigation request is sent at 1454. The response includes one or more actions identified by the natural language generator.

Figure 14C:
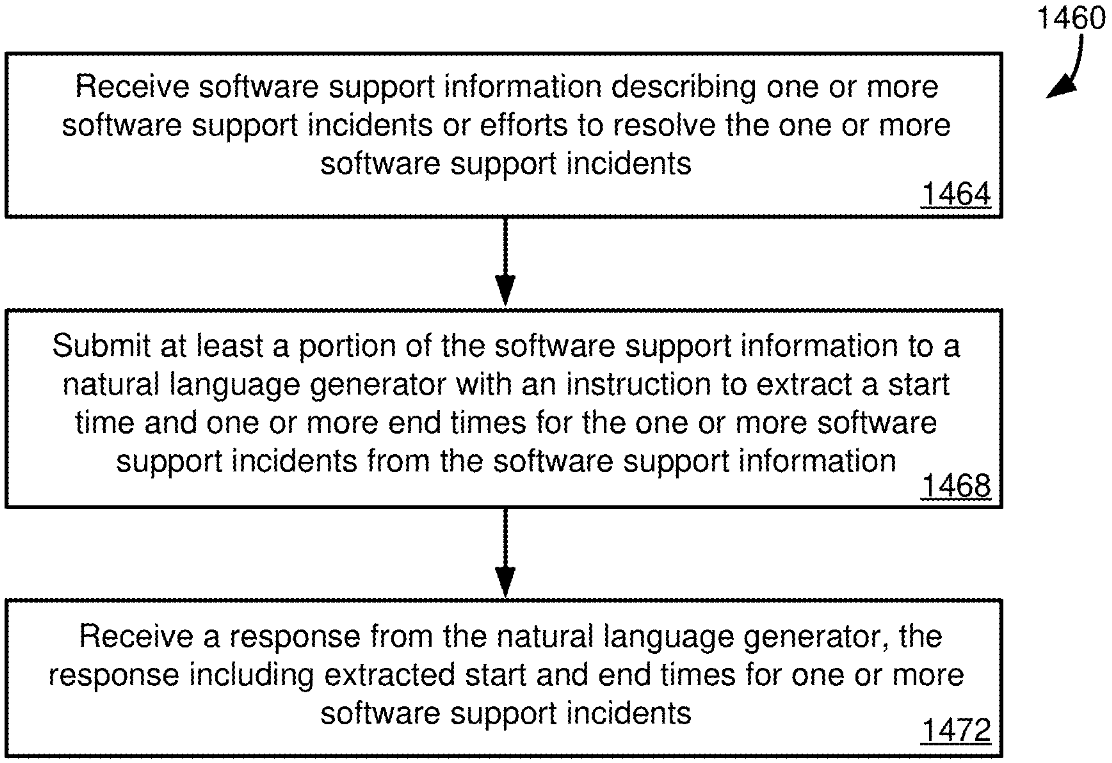
FIG. 14C is a flowchart of an example process 1460 of extracting start and end times for one or more software support incidents using a natural language generator.

FIG. 14C is a flowchart of an example process 1460 of extracting start and end times for one or more software support incidents using a natural language generator. At 1464, software support information describing one or more software support incidents or efforts to resolve the one or more software support incidents are received. At least a portion of the software support information are submitted to a natural language generator at 1468 with an instruction to extract a start time and one or more end times for the one or more software support incidents from the software support information. At 1472, a response from the natural language generator is received. The response includes extracted start and end times for one or more software support incidents.

Example 8—Additional Examples

Example 1 includes a computing system comprising at least one memory, one or more hardware processor units coupled to the at least one memory, and one or more computer-readable storage media storing computer-executable instructions that, when executed, cause the computing system to perform operations. These operations include receiving a request to generate an incident report for a software support incident, receiving information describing the software support incident, submitting at least a portion of the information describing the software support incident to a natural language generator in a prompt comprising instructions defining a report format or with a report template or report example, receiving a response from the natural language generator comprising entries for one or more fields defined in the report template, inserting the entries into a report for the software support incident by executing at least a portion of the computer-executable instructions, and saving the report in a work management tool.

Example 2 includes the subject matter of Example 1, involving operations wherein receiving information describing the software support incident comprises receiving communications between software support engineers discussing the software support incident.

Example 3 includes the subject matter of Example 2. The operations further include extracting at least a portion of the information describing the software support incident to provide extracted incident information and storing at least a portion of the extracted incident information in a relational database.

Example 4 includes the subject matter of Example 3. The extracting at least a portion of the information involves submitting the communications between software support engineers to a natural language generator in a prompt defining an extraction task.

Example 5 includes the subject matter of Example 4. The incident start time and at least one incident end time are in different date or time formats.

Example 6 includes the subject matter of Example 5. The prompt defining an extraction task includes an instruction to convert incident start and end times to a common format.

Example 7 includes the subject matter of Example 5. The software support incident is associated with multiple end times and the natural language generator associates the multiple end times with an incident start time for the software support incident.

Example 8 includes the subject matter of any of Examples 3-7. The extracting is performed automatically according to a schedule.

Example 9 is a method implemented in a computing system comprising at least one hardware processor and at least one memory. It involves receiving a software support incident mitigation request, which includes an incident identifier and incident information for a software support incident; encoding the incident information to provide semantic embeddings for the incident information; searching stored semantic embeddings of historical information for historical software incidents; identifying one more historical software incidents similar to the semantic embeddings for the incident information; submitting the semantic embeddings of the one or more historical software incidents to a natural language generator with an instruction to identify actions to resolve the software support incident based on the one or more historical software incidents; and sending a response to the software support incident mitigation request, comprising one or more actions identified by the natural language generator.

Example 10 includes the subject matter of Example 9. Submitting embeddings of the one or more historical software incidents includes submitting a prompt to the natural language generator that comprises a mitigation report template or an example mitigation response.

Example 11 includes one or more computer-readable storage media comprising computer-executable instructions that, when executed by a computing system comprising at least one hardware processor and at least one memory, cause the computing system to receive software support information describing one or more software support incidents or efforts to resolve the one or more software support incidents; submit at least a portion of the software support information to a natural language generator with an instruction to extract a start time and one or more end times for the one or more software support incidents from the software support information; and receive a response from the natural language generator, the response comprising extracted start and end times for one or more software support incidents.

Example 12 includes the subject matter of Example 11. The media further include computer-executable instructions that cause the computing system to submit an instruction to the natural language generator to convert the extracted start and end times to a common format.

Example 13 includes the subject matter of Example 12. The instructions to convert the extracted start and end times to a common format are provided in a prompt to the natural language generator separate from a prompt comprising the instruction to extract the start and one or more end times.

Example 14 includes the subject matter of Example 13. The one or more software support incidents comprise a plurality of software support instances and multiple prompts comprising the instruction to extract the start and one or more end times are submitted to the natural language generator, and the extracted start and one or more end times for the plurality of software support incidents are collectively submitted to the natural language generator in the prompt to convert the extracted start and one or more end times to a common format.

Example 15 includes the subject matter of Example 14. The prompt to convert the extracted start and one or more end times to a common format further includes an instruction to associate a start time and one or more end times in the common format with corresponding software support incidents of the plurality of software support incidents.

Example 16 includes the subject matter of Example 15. The media further comprise computer-executable instructions that, when executed by the computing system, cause the computing system to calculate respective durations for software support incidents of the plurality of software support incidents.

Example 17 includes the subject matter of Example 16. The media further comprise computer-executable instructions that, when executed by the computing system, cause the computing system to render a display of identifiers of respective software support incidents and their respective durations.

Example 18 includes the subject matter of Example 17. The media further comprise computer-executable instructions that, when executed by the computing system, cause the computing system to calculate an aggregated duration of software support incidents over a specified time period; subtract the aggregated duration of software support incidents from an amount specified for the specified time period to provide a result; and cause the result to be rendered for display in a user interface.

Example 19 includes the subject matter of any of Examples 15-18. The prompt to convert the extracted start and end times to a common format further includes an instruction to generate operations to insert into a database information for the plurality of software support incidents and their respective start and end times.

Example 20 includes the subject matter of Example 19. The prompt includes an example insert operation or insert operation template.

Example 9—Computing Systems

Figure 15:
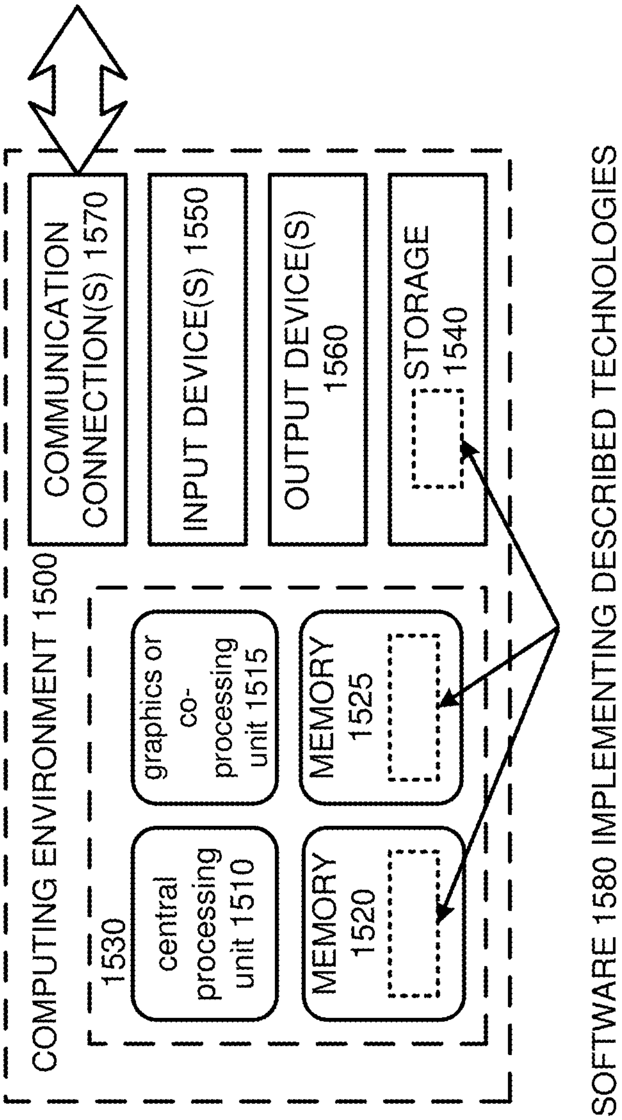
FIG. 15 is a diagram of an example computing system in which some described embodiments can be implemented.

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way, and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 16:
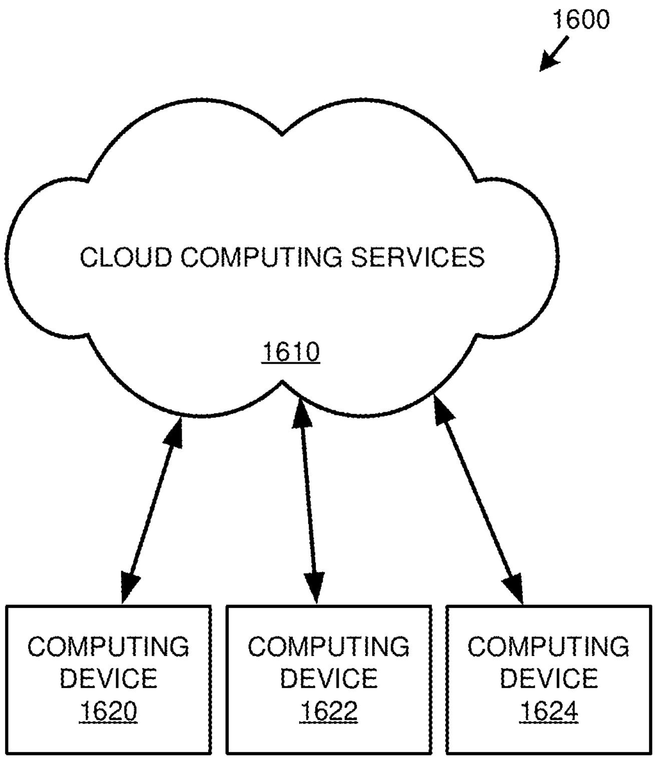
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

receiving a request associated with a software support incident;

retrieving, from one or more fact sources identified by the request, information describing the software support incident, the one or more fact sources including at least one of a monitor-generated alert, a log, a database, or a collaboration-tool communication;

determining that at least a portion of the retrieved information exceeds a single-prompt token limit associated with processing of the retrieved information;

splitting the at least a portion of the retrieved information into a plurality of portions based on the single-prompt token limit;

for each portion of the plurality of portions, causing a natural language generator to process the portion to extract candidate incident data including an issue key, a component name, and one or more candidate incident start times or candidate incident end times;

combining results of the processing of the plurality of portions to generate combined incident data;

causing further processing of the combined incident data to identify one or more incident occurrences incident start times and incident end times, including associating incident start times with corresponding incident end times according to an association rule that couples a later incident end time to a corresponding incident start time when the later incident end time is unpaired;

generating structured incident data for the one or more incident occurrences based on the issue key, component name, incident start times and associated incident end times; and storing the structured incident data in a data store for subsequent automated processing;

wherein the splitting based on the single-prompt token limit and the identifying of the one or more incident occurrences from the combined incident data reduce a number of processing calls required to process information that exceeds the single-prompt token limit.

2. The computing system of claim 1, wherein receiving information describing the software support incident comprising receiving communications between software support engineers discussing the software support incident.

3. The computing system of claim 2, the operations further comprising:

generating structured incident data based on at least a portion of the information describing the software support incident; and storing the structured incident data in a relational database.

4. The computing system of claim 3, wherein the structured incident data comprises an incident start time and at least one incident end time, and generating the structured incident data comprises causing processing of the communications between software support engineers to extract the incident start time and the at least one incident end time.

5. The computing system of claim 3, wherein the extracting is performed automatically according to a schedule.

6. The computing system of claim 4, wherein the incident start time and at least one incident end time are in different date or time formats.

7. The computing system of claim 6, further comprising normalizing the incident start time and the at least one incident end time by converting the incident start time and the at least one incident end time to a common format.

8. The computing system of claim 6, wherein the software support incident is associated with multiple end times and identifying the one or more incident occurrences comprises associating the multiple end times with a corresponding incident start time according to an association rule that couples a later end time to the corresponding incident start time when the later end time is unpaired.

9. A method, implemented in a computing system comprising at least one hardware processor and at least one memory coupled to the at least one hardware processor, the method comprising:

receiving a software support incident mitigation request, the software support incident mitigation request comprising an incident identifier and incident information for a software support incident;

retrieving, from one or more fact sources associated with the incident identifier, information describing the software support incident, the one or more fact sources including at least one of a monitor-generated alert, a log, a database, or a collaboration-tool communication;

determining that at least a portion of the retrieved information exceeds a single-prompt token limit associated with processing of the retrieved information;

splitting the at least a portion of the retrieved information into a plurality of portions based on the single-prompt token limit;

for each of the plurality of portions, causing a natural language generator to process the portion to extract candidate incident data including at least one of an incident start time or an incident end time;

combining results of the processing of the plurality of portions to generate combined incident data;

causing further processing of the combined incident data to identify one or more incident occurrences based on the incident start times and incident end times, including associating incident start times with corresponding incident end times according to an association rule that couples a later incident end time to a corresponding incident start time when the later incident end time is unpaired;

calculating a duration for each of the one or more incident occurrences based on the associated incident start and end times;

generating structured incident data for the one or more incident occurrences based on the incident start times, the associated incident end times, and the calculated durations;

encoding at least a portion of the structured incident data to provide semantic embeddings;

searching stored semantic embeddings of historical incident data for historical software incidents;

identifying one or more historical software incidents similar to the semantic embeddings of the structured incident data;

determining one or more mitigation actions for the software support incident based on the identified one or more historical software incidents; and causing the one or more mitigation actions to be provided in response to the software support incident mitigation request;

wherein the splitting based on the single-prompt token limit and identifying the one or more incident occurrences from the combined incident data reduce processing calls for information exceeding the single-prompt token limit and reduce inconsistencies in derived incident data caused by timestamps associated with unpaired or ambiguously ordered incident end times.

10. The method of claim 9, wherein determining the one or more mitigation actions comprises applying one or more constraints derived from a predefined mitigation response format or a stored example mitigation response.

11. One or more computer-readable storage media comprising:

computer-executable instructions that, when executed by a computing system comprising at least one hardware processor and at least one memory coupled to the at least one hardware processor, cause the computing system to retrieve, from one or more data sources, software support information describing one or more software support incidents or efforts to resolve the one or more software support incidents;

computer-executable instructions that, when executed by the computing system, cause the computing system to determine that at least a portion of the software support information exceeds a single-prompt token limit associated with processing of the software support information;

computer-executable instructions that, when executed by the computing system, cause the computing system to split the at least a portion of the software support information into a plurality of portions based on the single-prompt token limit;

computer-executable instructions that, when executed by the computing system, cause the computing system to, for each of the plurality of portions, cause a natural language generator to process the portion to extract candidate incident data including at least one of a start time or an end time for the one or more software support incidents;

computer-executable instructions that, when executed by the computing system, cause the computing system to combine results of the processing of the plurality of portions to generate combined incident data;

computer-executable instructions that, when executed by the computing system, cause the computing system to cause further processing of the combined incident data to identify one or more incident occurrences based on the start times and end times, including associating start times with corresponding end times according to an association rule that couples a later end time to a corresponding start time when the later end time is unpaired; and computer-executable instructions that, when executed by the computing system, cause the computing system to generate structured incident data for the one or more incident occurrences based on the start times and associated end times;

wherein the splitting based on the single-prompt token limit and identifying the one or more incident occurrences from combined incident data reduce processing calls for information exceeding the single-prompt token limit and reduce inconsistencies caused by unpaired or ambiguously ordered end times.

12. The one or more computer-readable storage media of claim 11, further comprising:

computer-executable instructions that, when executed by the computing system, cause the computing system to submit normalize the extracted start times and end times to a common format.

13. The one or more computer-readable storage media of claim 12, further comprising:

normalizaing the extracted start times and end times in a processing stage separate from a processing stage that extracts the start times and the one or more end times.

14. The one or more computer-readable storage media of claim 13, wherein the one or more software support incidents comprise a plurality of software support instances, and extracting the start times and the one or more end times comprises processing a plurality of portions of the software support information, and the extracted start times and the one or more end times for the plurality of software support instances are combined prior to normalization.

15. The one or more computer-readable storage media of claim 14, wherein identifying the one or more incident occurrences comprises associating a start time and one or more end times in the common format with corresponding software support incidents of the plurality of software support incidents according to an association rule that couples a later end time to a corresponding start time when the later end time is unpaired.

16. The one or more computer-readable storage media of claim 15, wherein generating the operations to insert into the database comprises generating the operations in accordance with a predefined insert operation format or template.

17. The one or more computer-readable storage media of claim 15, wherein generating structured incident data comprises generating operations to insert into a database information for the plurality of software support incidents and their respective start and end times.

18. The one or more computer-readable storage media of claim 17, further comprising:

computer-executable instructions that, when executed by the computing system, cause the computing system to calculate respective durations for software support incidents of the plurality of software support incidents.

19. The one or more computer-readable storage media of claim 18, further comprising:

computer-executable instructions that, when executed by the computing system, cause the computing system to render a display of identifiers of respective software support incidents and their respective durations.

20. The one or more computer-readable storage media of claim 19, further comprising:

computer-executable instructions that, when executed by the computing system, cause the computing system to calculate an aggregated duration of software support incidents over a specified time period;

computer-executable instructions that, when executed by the computing system, cause the computing system to subtract the aggregated duration of software support incidents from an amount specified for the specified time period to provide a result; and computer-executable instructions that, when executed by the computing system, cause the computing system to cause the result to be rendered for display in a user interface.

* * * * *